United States Patent [19]
Darnell et al.

[11] Patent Number: 5,043,736
[45] Date of Patent: Aug. 27, 1991

[54] CELLULAR POSITION LOCATING SYSTEM

[75] Inventors: Ralph D. Darnell, Friendswood; Claude C. Douglas, Houston, both of Tex.

[73] Assignee: CAE-Link Corporation, Binghamton, N.Y.

[21] Appl. No.: 558,651

[22] Filed: Jul. 27, 1990

[51] Int. Cl.$^5$ .............................................. H04B 7/185
[52] U.S. Cl. ................................................. 342/357
[58] Field of Search ............... 342/357, 450, 451, 454, 342/457

[56] References Cited

U.S. PATENT DOCUMENTS

| | | | |
|---|---|---|---|
| 4,445,118 | 4/1984 | Taylor et al. | 342/357 |
| 4,651,157 | 3/1987 | Gray et al. | 342/450 X |
| 4,809,005 | 2/1989 | Counselman, III | 342/357 X |
| 4,907,290 | 3/1990 | Crompton | 342/457 X |
| 4,912,756 | 3/1990 | Hop | 379/60 |
| 4,953,198 | 8/1990 | Daly et al. | 379/61 |

Primary Examiner—Mark Hellner
Attorney, Agent, or Firm—Malin, Haley, McHale, Dimaggio & Crosby

[57] ABSTRACT

The invention comprises a portable locating unit useful both as a cellular telephone and portable global positioning system that provides latitude and longitude information remotely to a base unit display. The system includes a small hand held receiver that receives signals from a satellite global positioning system and timing and computing circuits to provide location information signals. The hand held unit also includes a modem and transmitter to a cellular telephone network which is connected to the base unit computational system and display. The location of an individual or object can thus be determined at the remote station through the use of the cellular telephone network.

4 Claims, 4 Drawing Sheets

CELLULAR POSITION LOCATING SYSTEM

BACKGROUND OF THE INVENTION

1. Field of the Invention

This invention relates to a system for ascertaining the latitude and longitude of an individual or object at a remote location and transmitting information to a base operation using a man-pack or singular portable personnel unit that embodies a cellular telephone network in conjunction with a satellite navigation system, and specifically to a hand-held locating unit that can serve both as a cellular telephone and a portable globular positioning system to provide latitude and longitude information for display at a base unit.

2. Description of the Prior Art

The prior art shows a plethora of systems for locating individual vehicles relative to a central station. Raoux U.S. Pat. No. 4,701,760, issued on Oct. 20, 1987 shows a vehicle monitoring system that uses World Omega Network and a vehicle carried receiver to provide approximate coordinates to a central location. DiLulo et al, U.S. Pat. No. 4,897,642, issued Jan. 30, 1990, shows a method for monitoring the status of a multiple part vehicle (such as an eighteen wheel truck) and its cargo carrier through the use of satellites and an earth station.

Knickel U.S. Pat. No. 3,568,161, issued Mar. 2, 1971 shows a vehicle locator system which employs a plurality of sensor stations and a central station. Green et al, U.S. Pat. No. 4,791,572 issued Dec. 13, 1988, shows a locating system that uses the LORAN-C system for positioning information. Gray U.S. Pat. No. 4,891,761, issued Jan. 2, 1990, shows a system for updating a digitized map comparing known and unknown intersections in conjunction with a navigational tracking unit.

The units described in the prior art are complex in operation and do not utilize available cellular telephone technology. The present invention overcomes problems of the prior art by providing a non-complex portable hand-held unit that has cross country capability and versatility for use as a regular cellular telephone in conjunction with a precise navigational locating system that can be conveniently and easily carried for transmission and display of position information at a base location.

BRIEF SUMMARY OF THE INVENTION

A global positioning system especially adapted for use by an individual or object that includes a portable remote unit and a base information display unit. The portable remote unit includes an RF receiver circuit for use with a satellite navigation system, a microprocessor for analyzing coded signals, cellular phone modem circuits for transmitting encoded signals to the base unit and a time of day clock. The base unit includes a computational system for decoding position data and a visual display device for presenting the remote unit map coordinates.

The portable remote unit is comprised of four subsystems which include the global positioning system RF "L" band antenna and receiver that receives signals from a plurality of existing satellites. A microprocessor is used as the computational system that receives the output from a signal demodulator in the GPS receiver. The central timing circuit for accurate time of day has outputs connected to the GPS demodulator and the microprocessor. The GPS receiver generates its own ephemeris data called "Pseudo Random Code" and a code train that matches the satellite code exactly. The Pseudo Random Code is generated at the same time as the satellite codes are received. The received train of pulses from the satellite is then matched with the Pseudo Random Code to provide a time difference between satellite time and the Pseudo Random Code generated time which provides for satellite range. The information is then stored in memory and provided to a cellular telephone modem and transmitter for transmission through the cellular telephone system.

The base unit, which receives and coordinates the locations of various personnel at the remote locations, includes a computation system for decoding the position data transmitted from the remote units through the cellular telephone system. The base unit uses a computer that includes a visual display device showing a map upon which the decoded position data will be used to show coordinates in latitude and longitude of each remote unit.

The remote unit in one configuration may be a small hand-held unit using battery power that includes a GPS helix antenna for receiving satellite signals and a cellular antenna for transmission of the coded position information to the cellular telephone system. The remote unit could also be configured to use electrical power from a vehicle.

When using the present invention it should be noted that the invention combines an existing global navigational positioning system through the use of satellites, cellular telephone technology, computer and modem interfaces. Thus the hand carried unit is self contained. The remote unit includes a special modem system which could use, in one example, Bell 202A Protocol without the use of a dial tone, in order to transfer position data from computer memory to the cellular phone system. The hand held unit also includes frequency shift circuitry built within and in one embodiment may use a BAUD rate of 1200 bits per second.

It is an object of this invention to provide a hand held "man pack unit" for use by an individual or object to provide geographical positioning information such as latitude and longitude from a remote site to a base unit using cellular telephone methodology.

It is another object of this invention to provide a relatively small portable hand held unit that can provide geographical positioning information throughout the globe to a base unit having a display of the geographical location on a map.

It is another object of this invention to provide a low cost, readily available global positioning system for use by individuals or objects at remote locations to provide geographical positioning information of the individuals or objects to a base station using existing satellite and cellular telephone technologies.

In accordance with these and other objects which will be apparent hereinafter, the instant invention will now be described with particular reference to the accompanying drawings.

PREFERRED EMBODIMENT OF THE INVENTION

Figure 1:
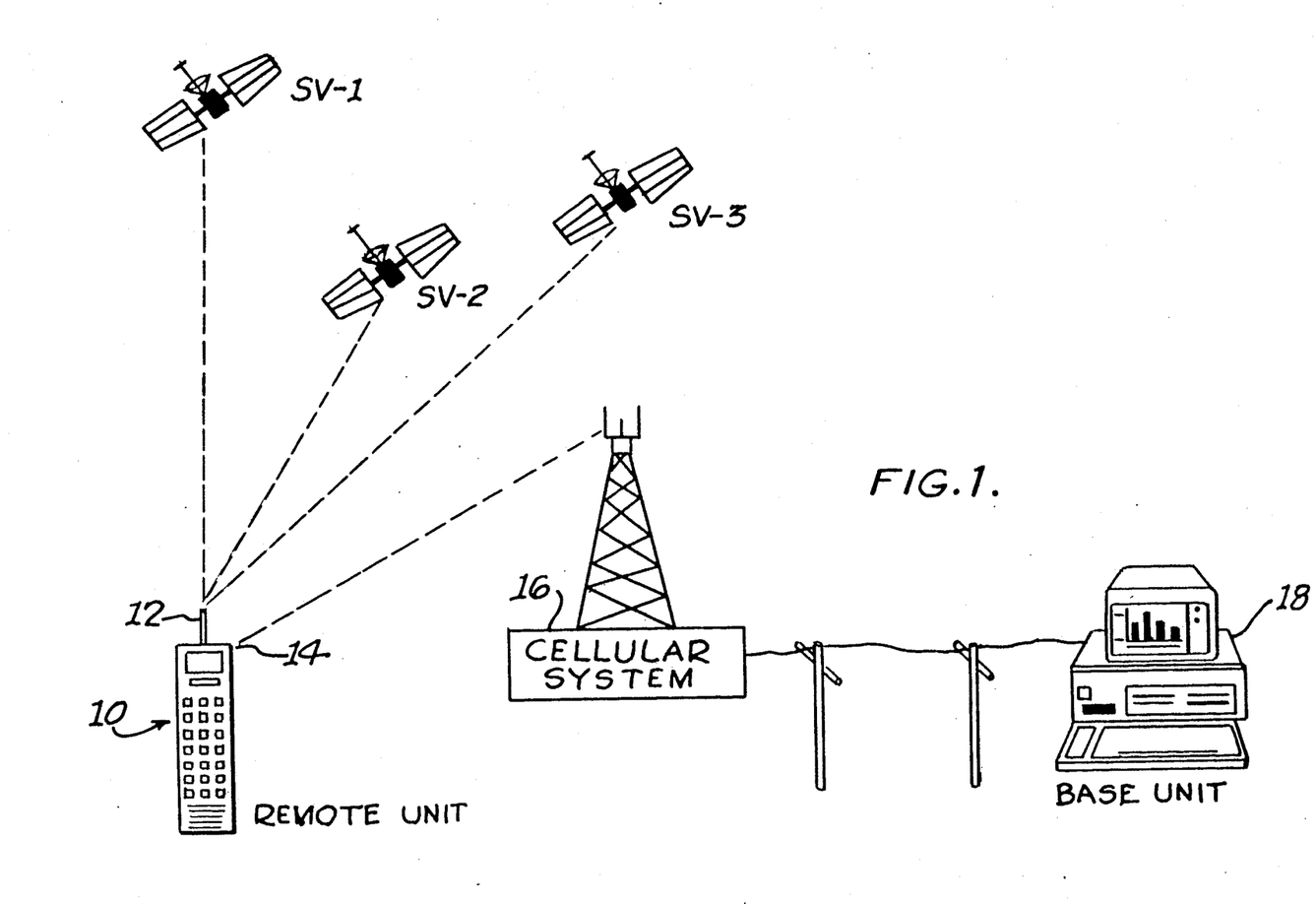
FIG. 1 shows a basic schematic diagram of the system according to the invention.
Figure 2:
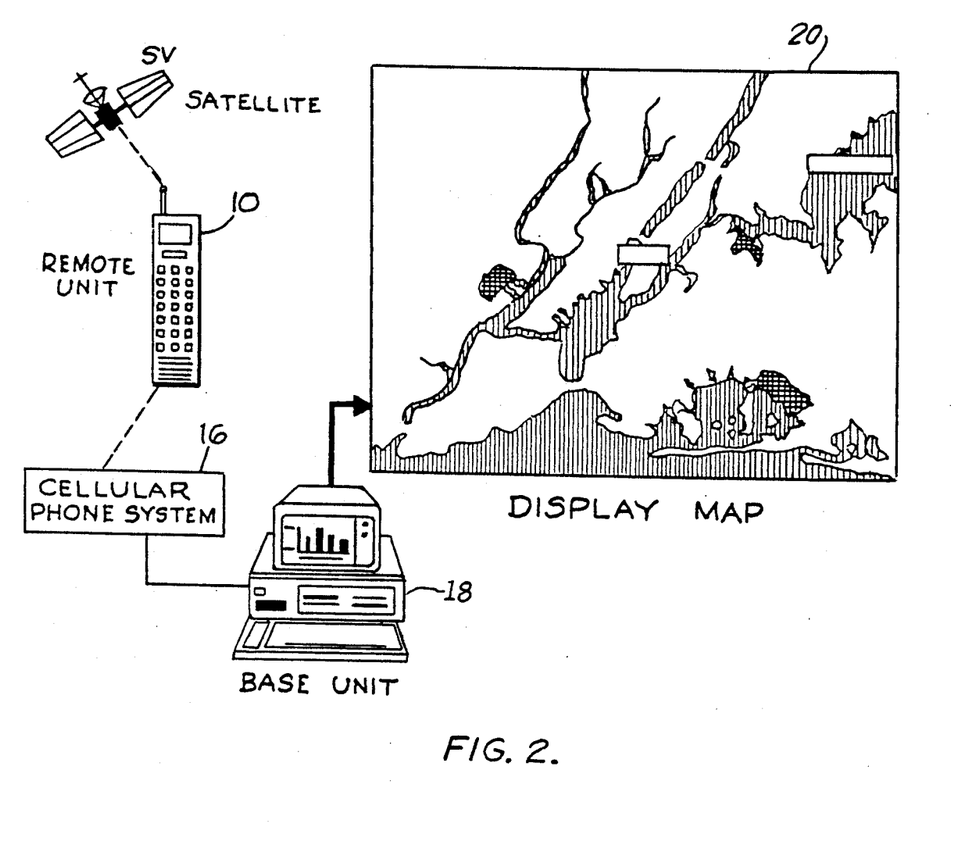
FIG. 2 shows an additional schematic diagram of the basic intervention.

Referring now to FIG. 1, the invention is shown which uses signals from satellites SV1, SV2 and SV3 which are transmitted to the remote unit 10 having a first antenna 12 for receiving the signals from the satellites and second antenna 14 for transmitting the appropriate signals to a cellular telephone system 16. The cellular telephone system then provides the proper signals to the base unit whereupon the information is transformed into a display. FIG. 2 shows the base unit which includes a computer 18 connected to a visual display 20 which will provide the appropriate latitude and longitude location of the remote unit 10 on the display map.

Overall, the invention is comprised of the remote unit 10, a cellular phone system 16 and the base unit 18. The remote unit 10 includes an RF "L" band receiver for the global positioning system, a computational system comprised of a microprocessor, a cellular telephone and a special telephone modem system. The base unit 18 is comprised of a computational system 18 for decoding position data received from remote units and includes a visual display 20 which presents the remote unit map coordinates on a map display.

Figure 3:
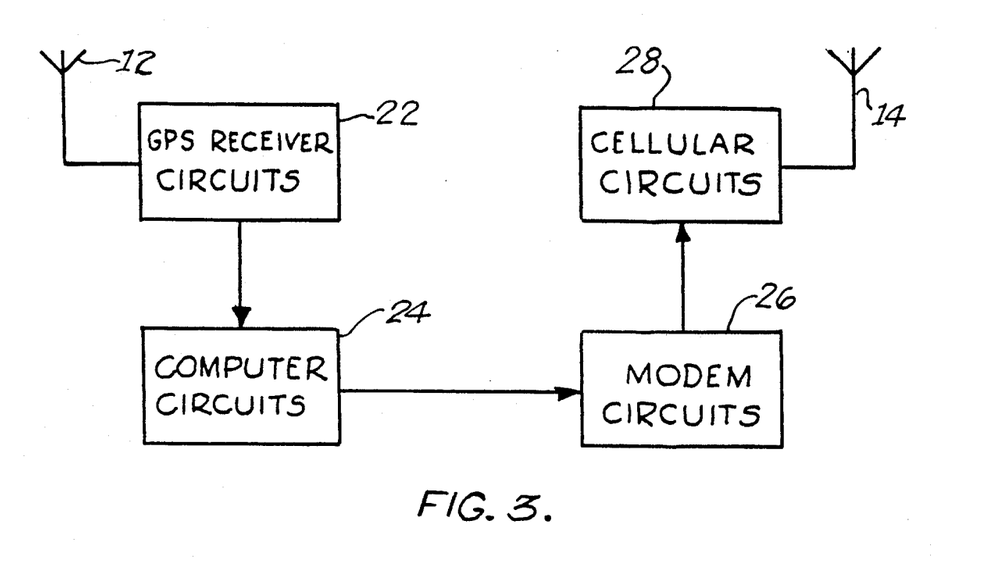
FIG. 3 shows a schematic circuit diagram of the remote unit used in the present invention.

Referring now to FIG. 3, a remote unit 10 is shown comprised of the helix L band antenna 12 connected to the global positioning system receiver circuits 22 having an output to microprocessor circuits 24. The output of the microprocessor circuits 24 is connected to modem circuits 26 and to the cellular telephone circuits 28 whose output goes to antenna 14 for transmission to a cellular telephone receiver.

Figure 4:
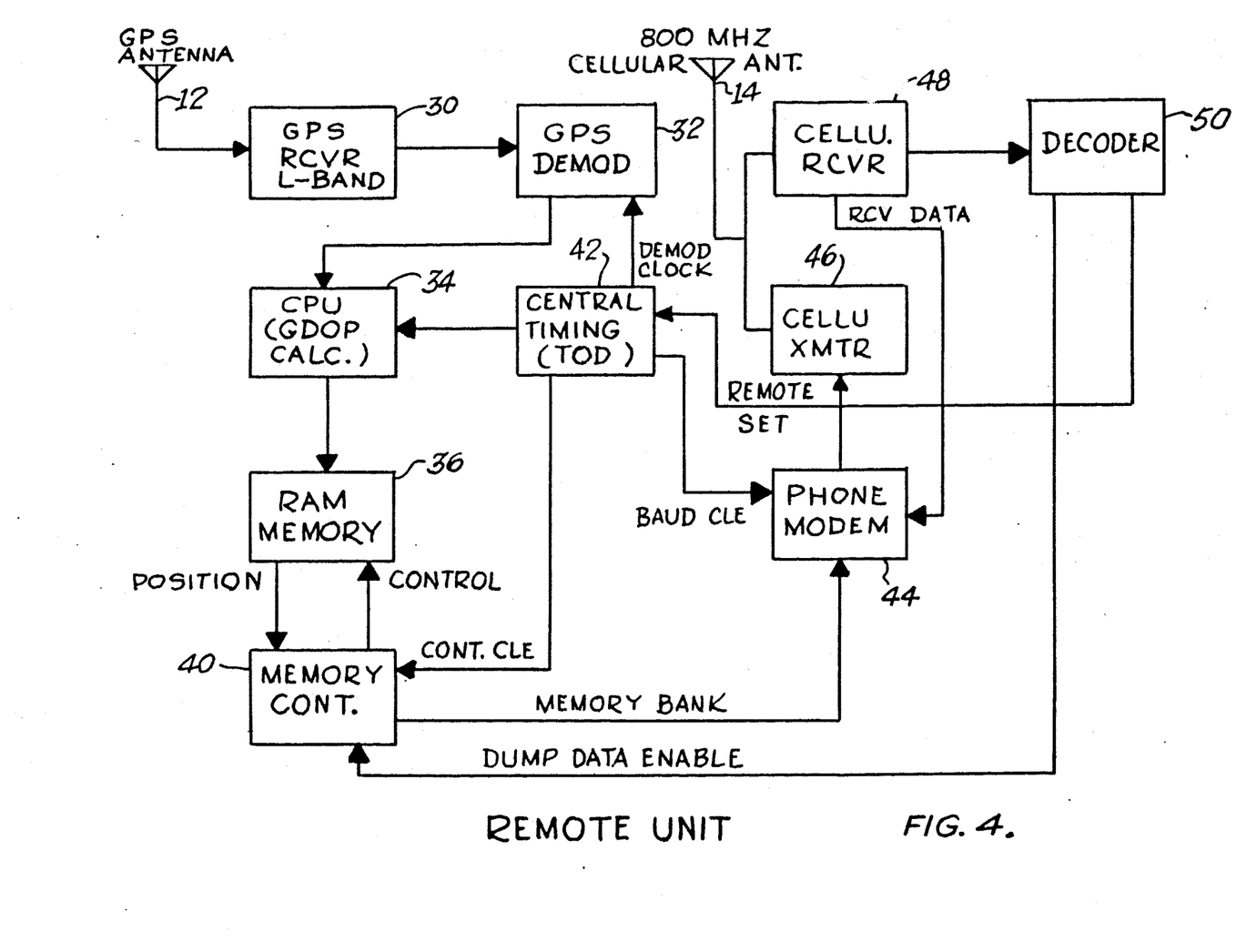
FIG. 4 shows a block diagram showing the basic circuitry of the remote unit.

Referring now to FIG. 4, a more detailed diagram of the remote unit is shown. Antenna 12 receives an L band signal from the global positioning system and satellite network and receiver 30 which is sent to a demodulator 32 and to the microprocessor 34 for GDOP (Geometric Dillusion of Precision) calculations. The microprocessor 34 also receives correct time of day signals from central timing 42. The microprocessor 34 generates pseudo random code based on exactly the same time as the satellite signal. The pseudo random code train then matches the satellite code exactly. The received train pulses from the satellites are then matched with the pseudo code train. The difference in time between the satellite time and pseudo code generated time gives the satellite ranges based on distance=velocity×time. The information is then stored in the random access memory (RAM) 36 which itself is connected to the memory controller 40.

Once the signal is processed and stored in the RAM 36, the information can be transferred through memory controller to the phone modem 44 from which it is sent to the cellular transmitter 46 for sending the information through antenna 14.

The remote unit also includes a cellular telephone receiver 48 for receiving data including a decoder 50 which connects back to the memory control and central timing to permit control from the base unit via the cellular telephone system. Referring back to FIG. 2, once the signal is sent from the remote unit through the cellular phone system 16, and it is received at a CPU at the base unit, the computer 18 at the base unit will then decode the signal and translate it into information in a suitable display 20 which will show the geographical coordinates of latitude and longitude on a map on the display.

Figure 5:
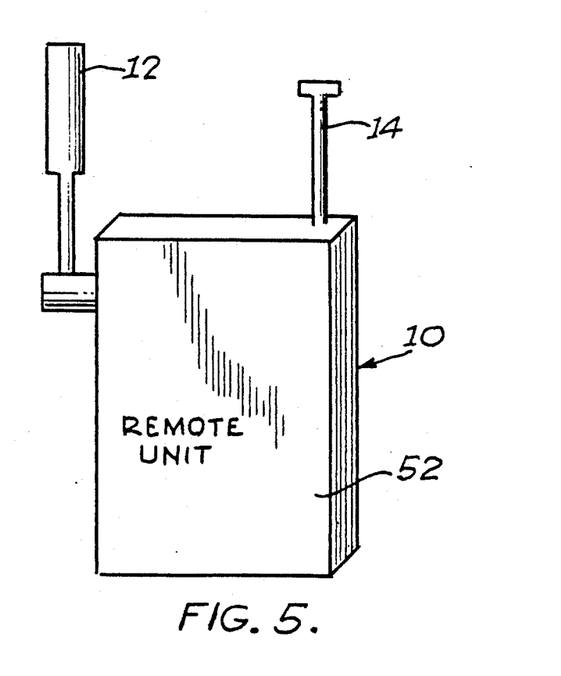
FIG. 5 shows one possible configuration of a remote unit in a perspective view.

Referring now to FIG. 5, a possible configuration of the remote unit is shown which includes the helix antenna 12 for receiving the global positioning system signals and the cellular antenna 14, all of which is mounted in a small rectangular housing 52 which could be dimensionally sized to be hand held. The remote unit could also be configured in a vehicle to use vehicle power, and as such, if used for surveillance or military use, the antennas could be hidden.

The invention as described provides for a portable hand carried or vehicle remote unit that allows individuals or objects to be located from a base station anywhere in the world using a non-complex, relatively inexpensive system that employs current cellular phone technology.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A cellular position locating system for locating the geographical coordinates of a person at a remote location using a portable hand held remote unit and a cellular telephone system comprising:

receiver means for receiving navigational signals from satellites in orbit about the earth;

signal processing means for demodulating the satellite navigationals signals;

means for generating a pseudo random code;

timing means connected to said signal processing means demodulating means and said signal processing means;

means for generating position information signals by comparing the time difference of the navigational signals and the pseudo random code signals;

means for converting said position information signals into cellular telephone signals;

cellular telephone signal transmitting means;

cellular telephone system for receiving and transmitting said transmitted cellular telephone signals;

base unit means coupled to said cellular telephone system for processing cellular telephone signals received from said cellular transmitter;

said base unit means including means for decoding the received signal for determining geographic location position data; and a display means connected to said base unit for displaying the geographical coordinate information.

2. A method for locating a person or object at a remote location from a base location comprising the steps of:

(a) receiving navigational information signals from a satellite location at a remote location;

(b) generating a pseudo random code at the remote location and comparing it to a known time signal relative to the satellite navigational signals;

(c) providing cellular telephone modem signal processing means for transforming the navigational information into a cellular telephone signal;

(d) transmitting the cellular telephone signal containing the navigational signal information to a cellular telephone network;

(e) receiving the cellular telephone signal containing the navigational signal information through a cellular telephone to a central processing unit;

(f) displaying the navigational signal information received at a base unit.

3. A cellular position locating system to provide latitude and longitude information from a remote site to a base site comprising:

a portable housing sized to be hand held;

portable navigational satellite signal receiving means mounted in said housing;

means for generating a pseudo random code mounted in said housing;

timing means to provide time of day mounted in said housing;

satellite signal and pseudo random code processing means having inputs connected to said navigational satellite signal receiving means, pseudo random code generating means and said timing means to provide an output signal representing the geographical location of said satellite signal receiving means;

telephone modem means connected to the output of said satellite signal processing means for converting said geographical location output signal into a cellular telephone signal;

cellular telephone signal transmitter connected to said modem and mounted in said housing;

cellular telephone signal network for receiving and transmitting cellular telephone signals; and a base unit connected to said cellular telephone signal network for receiving said cellular telephone signals representing said geographical location and for providing a display that represents said geographical location of said navigational satellite signal receiving means.

4. A cellular position locating system as in claim 3, including:

a cellular telephone signal receiver mounted in said housing to receive command signals from said base unit; and memory means mounted in said housing and connected to said cellular telephone signal receiver and said signal processing means to provide control to said satellite signal processing means.

* * * * *

REEXAMINATION CERTIFICATE (2380th)­
United States Patent [19]
Darnell et al.

[11] B1 5,043,736
[45] Certificate Issued Sep. 6, 1994

[54] CELLULAR POSITION LOCATION SYSTEM

[75] Inventors: Ralph D. Darnell, Friendswood; Claude C. Douglas, Houston, both of Tex.

[73] Assignee: CAE-Link Corporation, Binghamton, N.Y.

Reexamination Request:
No. 90/002,943, Jan. 28, 1993

Reexamination Certificate for:
Patent No.: 5,043,736
Issued: Aug. 27, 1991
Appl. No.: 558,651
Filed: Jul. 27, 1990

[51] Int. Cl.$^5$ .......................................... H04B 7/185
[52] U.S. Cl. .................................................. 342/357
[58] Field of Search ............... 342/357, 450, 451, 454, 342/457

[56] References Cited
U.S. PATENT DOCUMENTS
4,750,197 6/1988 Denekamp et al. .
4,754,465 6/1988 Trimble .
5,014,206 5/1991 Scribner et al. .

FOREIGN PATENT DOCUMENTS
WO8912835 12/1989 PCT Int'l Appl. ............ G01S 5/02

OTHER PUBLICATIONS
"GPS-Based Vessel Position Monitoring and Display System", IEEE 1990 Position Location and Navigation Symposium, Mar. 20, 1990.
Trimble Data Sheet dated May 1989 disclosing hand held GPS Receiver Sold by Trimble Navigation under the name "TRIMPACK".

*Primary Examiner*—Mark Hellner

[57] ABSTRACT

The invention comprises a portable locating unit useful both as a cellular telephone and portable global positioning system that provides latitude and longitude information remotely to a base unit display. The system includes a small hand held receiver that receives signals from a satellite global positioning system and timing and computing circuits to provide location information signals. The hand held unit also includes a modem and transmitter to a cellular telephone network which is connected to the base unit computational system and display. The location of an individual or object can thus be determined at the remote station through the use of the cellular telephone network.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1,2 and 3 are determined to be patentable as amended.

Claim 4, dependent on an amended claim, is determined to be patentable.

New claims 5 and 6 are added and determined to be patentable.

1. A cellular position locating system for locating the geographical coordinates of a person at a remote location [using a portable hand held remote unit and a cellular telephone system] comprising:
   *a portable hand held remote unit, said remote unit comprising:*
   receiver means for receiving navigational signals from satellites in orbit about the earth;
   signal processing means for demodulating the satellite navigational signals;
   means for generating a pseudo random code;
   timing means connected to said signal processing means demodulating means and said signal processing means;
   means for generating position information signals by comparing the time difference of the navigational signals and the pseudo random code signals;
   means for converting said position information signals into cellular telephone signals;
   *means for temporarily storing said position information signals; and*
   cellular telephone signals transmitting means, *said cellular position locating system further comprising:*
   cellular telephone system for receiving and transmitting said transmitted cellular telephone signals;
   base unit means coupled to said cellular telephone system of processing cellular telephone signals received from said cellular transmitter;
   said base unit means including means for decoding the received signal for determining geographic location position data; and
   a display means connected to said base unit for displaying the geographical coordinate information.

2. A method for locating a person or object at a remote location from a base location comprising the steps of:
   (a) receiving navigational information signals from a satellite location at a remote location;
   (b) generating a pseudo random code at the remote location and comparing it to a known time signal relative to the satellite navigational signals;
   (c) *temporarily storing said satellite navigational signals;*
   [(c)] (*d*) providing cellular telephone modem signal processing means for *continuously* transforming the navigational information into a cellular telephone signal;
   [(d)] (*e*) transmitting the cellular telephone signal containing the navigational signal information to a cellular telephone network;
   [(e)] (*f*) receiving the cellular telephone signal containing the navigational signal information through a cellular telephone to a central processing unit; *and*
   1 [(f)] (*g*) displaying the navigational signal information received at a base unit.

3. A cellular position locating system to provide latitude and longitude information from a remote site to a base site comprising:
   a portable housing sized to be hand held;
   portable navigational satellite signal receiving means mounted in said housing;
   means for generating a pseudo random code mounted in said housing;
   timing means to provide time of day mounted in said housing;
   satellite signal and pseudo random code processing means having inputs connected to said navigational satellite signal receiving means, psuedo random code generating means and said timing means to provide an output signal representing the geographical location of said satellite signal receiving means;
   *means for temporatily storing said output signal;*
   telephone modem means connected to [the output of said satellite signal processing means] *said means for temporarily storing* for converting said geographical location output signal into a cellular telephone signal;
   cellular telephone signal transmitter connected to said modem and mounted in said housing;
   cellular telephone signal network for receiving and transmitting cellular telephone signals; and
   a base unit connected to said cellular tlephone signal network for receiving said cellular telephone signals, representing said geographical location and for providing a display that represents said geographical location of said navigational satellite signal receiving means.

5. *A cellular position locating system for locating the geographical coordinates of a person at a remote location, comprising:*
   *a portable hand held remote unit, said remote unit comprising:*
   *receiver means for receiving navigational signals from satellites in orbit about the earth;*
   *signal processing means for demodulating the satellite navigational signals;*
   *means for generating a pseudo random code;*
   *timing means connected to said signal processing means and said means for generating;*
   *means for generating position information signals by comparing the time difference of the navigational signals and the pseudo random code signals;*
   *means for temporarily storing said position information signals;*
   *means for converting said position information signals into cellular telephone signals; and*
   *cellular telephone signal transmitting means and receiving means, said cellular position locating system further comprising:* a cellular telephone system for receiving and transmitting a cellular telephone signal from said transmitting means;

base unit means coupled to said cellular telephone system for processing cellular telephone signals received from said cellular transmitter;

said base unit means including a means for decoding the received signal for determining geographic location position data; and display means connected to said base unit for displaying the geographic location data.

6. A method for locating a person or object at a remote location from a base location, comprising the steps of:

(a) receiving navigational information signals from a satellite location at a remote location;

(b) generating a pseudo random code at said remote location and comparing said code to a known time signal relative to said navigational information signals and producing a position signal therefrom;

(c) temporarily storing said position signal;

(d) providing cellular telephone modem signal processing means for continuously transforming said position signals into a cellular signal;

(e) transmitting said cellular telephone signal containing said position signal to a cellular telephone network;

(f) receiving the cellular telephone signal containing said position signal through a cellular telephone attached to a central processing unit; and (g) displaying the navigational signal information received at a base unit.

* * * * *

(12) EX PARTE REEXAMINATION CERTIFICATE (7193rd)
United States Patent
Darnell et al.

(10) Number: US 5,043,736 C2
(45) Certificate Issued: Nov. 24, 2009

(54) CELLULAR POSITION LOCATION SYSTEM

(75) Inventors: Ralph D. Darnell, Friendswood, TX (US); Claude C. Douglas, Houston, TX (US)

(73) Assignee: B.I. Incorporated

Reexamination Request:
No. 90/007,576, Jun. 6, 2005
No. 90/008,655, May 18, 2007

Reexamination Certificate for:
Patent No.: 5,043,736
Issued: Aug. 27, 1991
Appl. No.: 07/558,651
Filed: Jul. 27, 1990

Reexamination Certificate B1 5,043,736 issued Sep. 6, 1994

(51) Int. Cl.
*H04B 7/185* (2006.01)

(52) U.S. Cl. .................................................. 342/357.1
(58) Field of Classification Search ................ 342/357.1
See application file for complete search history.

(56) References Cited

U.S. PATENT DOCUMENTS

| 2,940,076 A | 6/1960 | Bissett et al. |
|---|---|---|
| 3,518,674 A | 6/1970 | Moorehead et al. |
| 3,665,312 A | 5/1972 | Jarvis |
| 3,680,121 A | 7/1972 | Anderson et al. |
| 3,697,941 A | 10/1972 | Christ |
| 3,703,714 A | 11/1972 | Andrews |
| 3,711,856 A | 1/1973 | Adrian et al. |
| 3,714,650 A | 1/1973 | Fuller et al. |
| 3,757,290 A | 9/1973 | Ross et al. |
| 3,984,807 A | 10/1976 | Haemmig |
| 4,053,893 A | 10/1977 | Boyer |
| 4,067,411 A | 1/1978 | Conley et al. |
| 4,083,003 A | 4/1978 | Haemmig |
| 4,259,664 A | 3/1981 | Boisclair |
| 4,435,711 A | 3/1984 | Ho et al. |
| 4,459,667 A | 7/1984 | Takeuchi |
| 4,547,778 A | 10/1985 | Hinkle et al. |
| 4,596,988 A | 6/1986 | Wanka |
| 4,651,156 A | 3/1987 | Martinez |
| 4,651,157 A | 3/1987 | Gray et al. |
| 4,680,590 A | 7/1987 | Lowe et al. |
| 4,689,626 A * | 8/1987 | Hori et al. ............... 324/357.12 |

(Continued)

FOREIGN PATENT DOCUMENTS

| EP | 123562 | 10/1984 |
|---|---|---|
| EP | 199266 | 10/1986 |
| EP | 0242099 | 10/1987 |
| FR | 2-541-801 | 8/1984 |
| FR | 2568834 | 7/1986 |
| WO | WO 89/12835 A1 * | 12/1989 |
| WO | WO89/12835 | 12/1989 |
| WO | WO 90/08371 A1 * | 7/1990 |

OTHER PUBLICATIONS

Trimble data sheet, May 1989, disclosing hand held GPS receiver sold by Trimble Navigation under the name "Trimpack".*

J.S. Bravman, et al., "Automatic Vehicle Monitoring", Wescon Technical Papers, 1976, vol. 20, No. 4, Hollywood, US.

(Continued)

*Primary Examiner*—Jimmy G Foster (57) ABSTRACT

The invention comprises a portable locating unit useful both as a cellular telephone and portable global positioning system that provides latitude and longitude information remotely to a base unit display. The system includes a small hand held receiver that receives signals from a satellite global positioning system and timing and computing circuits to provide location information signals. The hand held unit also includes a modem and transmitter to a cellular telephone network which is connected to the base unit computational system and display. The location of an individual or object can thus be determined at the remote station through the use of the cellular telephone network.

U.S. PATENT DOCUMENTS

| | | | |
|---|---|---|---|
| 4,701,760 A | | 10/1987 | Raoux |
| 4,740,792 A | | 4/1988 | Sagey et al. |
| 4,742,357 A | | 5/1988 | Rackley |
| 4,754,465 A | * | 6/1988 | Trimble ............... 375/376 |
| 4,791,572 A | | 12/1988 | Green, III et al. |
| 4,800,577 A | | 1/1989 | Tachita et al. |
| RE32,856 E | | 2/1989 | Millsap et al. |
| 4,812,852 A | | 3/1989 | Bent et al. |
| 4,818,998 A | | 4/1989 | Apsell et al. |
| 4,833,477 A | | 5/1989 | Tendler |
| 4,876,659 A | * | 10/1989 | Devereux et al. ........... 708/250 |
| 4,884,208 A | | 11/1989 | Marinelli et al. |
| 4,908,629 A | | 3/1990 | Apsell et al. |
| 4,916,455 A | | 4/1990 | Bent et al. |
| 4,928,107 A | * | 5/1990 | Kuroda et al. ......... 342/357.15 |
| 4,975,707 A | | 12/1990 | Smith |
| 5,003,317 A | | 3/1991 | Gray et al. |
| 5,020,090 A | * | 5/1991 | Morris ................. 455/556.1 |
| 5,021,794 A | | 6/1991 | Lawrence |
| 5,032,845 A | | 7/1991 | Velasco |
| 5,042,050 A | | 8/1991 | Owen |
| 5,081,667 A | | 1/1992 | Drori et al. |
| 5,119,102 A | | 6/1992 | Barnard |
| 5,119,504 A | * | 6/1992 | Durboraw, III ........... 455/556.2 |
| RE34,034 E | | 8/1992 | O'Sullivan |
| 5,164,904 A | | 11/1992 | Sumner |
| 5,182,555 A | | 1/1993 | Sumner |
| 5,187,810 A | | 2/1993 | Yoneyama et al. |
| 5,208,756 A | | 5/1993 | Song |
| 5,293,645 A | | 3/1994 | Sood |

OTHER PUBLICATIONS

P.W. Nilsen, "Application of the Global–Positioning System (GPS) to Automatic Vehicle Monitoring", Proceedings 1981 Carnahan Conference on Crime Countermeasures, May 13–15, 1981, Lexington, pp. 7–11, IEEE, New York, US.

Lezniak, et al., "A Dead Reckoning/Map Correlation System for Automatic Vehicle Tracking", IEEE Transactions on Vehicular Technology, Feb. 1977, vol. VT–26, No. 1.

Ott, "Vehicle Location in Cellular Mobile Radio Systems", IEEE Transactions on Vehicular Technology, Feb. 1977, vol. VT–26, No. 1.

Ritter, et al., "Automatic Vehicle Location—An Overview", IEEE Transactions on Vehicular Technology, Feb. 1977, vol. VT–26, No. 1.

Roth, "History of Automatic Vehicle Monitoring (AVM)", IEEE Transactions on Vehicular Technology, Feb. 1977, vol. VT–26, No. 1.

Verlag Tuv Rheinland, Second International Symposium on Land Vehicle Navigation, 1989, Jul. 4–7, 1989, Munster Federal Republic of Germany, Verlag TUV Rheinland.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 37–55:

Referring now to FIG. 4, a more detailed diagram of the remote unit shown. Antenna 12 receives an L band signal from the global positioning system and satellite network and receiver 30 which is sent to a demodulator 32 and to the microprocessor 34 for GDOP (Geometric [Dillusion] *Dilution* of Precision) calculations. The microprocessor 34 also receives correct time of day signals from central timing 42. The microprocessor 34 generates pseudo random code based on exactly the same time as the satellite signal. The pseudo random code train then matches the satellite code exactly. The received train pulses from the satellites area then matched with the pseudo code train. The difference in time between the satellite time and pseudo code generated time gives the satellite ranges based on distance=velocity×time. The information is then stored in the random access memory (RAM) 36 which itself is connected to the memory controller 40. *As shown in FIG. 4, the central timing 42 provides a control input to the memory controller 40. Central timing 42 also provides a signal to the demodulator 32.*

Column 3, lines 56–50:

Once the signal is processed and stored in the RAM 36, the information can be transferred through memory controller 40 to the phone modem 44, *receiving control inputs from the central timing 42 and the decoder 50,* from which it is sent to the *phone modem 44, and from the phone modem 44 to the* cellular transmitter 46 for sending the information through antenna 14.

Column 3, line 61 through column 4, line 4:

The remote unit also includes a cellular telephone receiver 48 for receiving data, including a decoder 50 which connects back to the memory [control] *controller* 40 and central timing 42 to permit control from the base unit via the cellular telephone system. Referring back to FIG. 2, once the signal is sent from the remote unit through the cellular phone system 16, and it is received at a CPU at the base unit, the computer 18 at the base unit will then decode the signal and translate it into informatin in a suitable display 20 which will show the geographical coordinates of latitude and longitude on a map on the display.

AS A RESULT OF REEXAMINATION, IT HAS BEEN DETERMINED THAT:

Claims 1–6 are determined to be patentable as amended.

New claims 7–37 are added and determined to be patentable.

1. A cellular position locating system for locating the geographical coordinates of a person at a remote location comprising:

a portable hand held remote unit, said remote unit comprising:

a receiver means for receiving navigational signals from satellites in orbit about the earth;

a signal processing means for demodulating the satellite navigational signals;

*a processing* means for generating a pseudo random code;

a timing means connected to said signal processing means [demodulating means] and said [signal] processing means, *the timing means for generating a time*;

a means for generating position information signals by comparing the time difference of the navigational signals and the pseudo random code signals;

a means for converting said position information signals into cellular telephone signals;

*wherein said timing means is further connected with a memory controller for controlling a data flow from said means for generating position information signals to said means for converting said position information signals into cellular telephone signals;* a means for temporarily storing said position information signals; and a cellular telephone signals transmitting means, said cellular position locating system further comprising:

a cellular telephone system for receiving and transmitting said transmitted cellular telephone signals;

a base unit means coupled to said cellular telephone system [of] *for* processing cellular telephone signals received from said cellular transmitter;

said base unit means including means for decoding the received signal for determining geographic location position data; and a display means connected to said base unit for displaying the geographical coordinate information.

2. A method for locating a person or object *using a hand held portable remote unit* at a remote location from a base location comprising the steps of:

(a) receiving navigational information signals from a satellite location at a remote location *in a portable hand held remote unit*;

(*a1*) *providing a timing module that provides a known time signal;*

(b) generating a pseudo random code *in said remote unit* at the remote location[and]*;*

(*b1*) *providing a converting module, and in the converting module:* comparing [it] *said code* to [a] *the* known time signal relative to the satellite navigational signals, *and wherein the timing module provides an output to the converting module*;

(c) temporarily storing said satellite navigational signals;

(d) providing cellular telephone modem signal processing means for continuously transforming the navigational information into a cellular telephone signal *in said remote unit*;

(e) transmitting the cellular telephone signal containing the navigational signal information to a cellular telephone network *from said remote unit*;

(f) receiving the cellular telephone signal containing the navigational signal information through a cellular telephone to a central processing unit; and (g) displaying the navigational signal information received at a base unit.

3. A cellular position locating system to provide latitude and longitude information from a remote site to a base site comprising:

a portable housing sized to be hand held;

*a portable navigational satellite signal receiving means mounted in said housing;*

*a* means for generating a pseudo random code mounted in said housing;

*a* timing means to provide time of day mounted in said housing;

*a* satellite signal and pseudo random code processing means having inputs connected to said navigational satellite signal receiving means, pseudo random code generating means and said timing means to provide an output signal representing the geographical location of said satellite signal receiving means;

*a* means for temporarily storing said output signal;

*a cellular telephone signal receiver, wherein the cellular telephone signal receiver has an output for controlling the timing means and the temporarily storing means;*

*a* telephone modem means connected to said means for temporarily storing for converting said geographical location output signal into a cellular telephone signal;

*a* cellular telephone signal transmitter connected to said modem and mounted in said housing;

*a* cellular telephone signal network for receiving and transmitting cellular telephone signals; and a base unit connected to said cellular telephone signal network for receiving said cellular telephone signals, representing said geographical location and for providing a display that represents said geographical location of said navigational satellite signal receiving means.

4. A cellular position locating system as in claim 3, including:

[a] *wherein the* cellular telephone signal receiver is mounted in said housing to receive command signals from said base unit; and memory means mounted in said housing and connected to said cellular telephone signal receiver and said signal processing means to provide control to said satellite signal processing means.

5. A cellular position locating system for locating the geographical coordinates of a person at a remote location, comprising:

a portable hand held remote unit, said remote unit comprising:

*a* receiver means for receiving navigational signals from satellites in orbit about the earth;

*a* signal processing means for demodulating the satellite navigational signals;

*a* means for generating a pseudo random code;

*a* timing means connected to said signal processing means and said means for generating;

*a* means for generating position information signals by comparing the time difference of the navigational signals and the pseudo random code signals;

*a* means for temporarily storing said position information signals;

*a* means for converting said position information signals into cellular telephone signals; [and]

*wherein said timing means is further connected with a memory controller for controlling a data flow from said means for generating position information signals to said means for converting said position information signals into cellular telephone signals; and*

*a* cellular telephone signal transmitting means and receiving means, said cellular position locating system further comprising:

a cellular telephone system for receiving and transmitting a cellular telephone signal from said transmitting means;

*a* base unit means coupled to said cellular telephone system for processing cellular telephone signals received from said cellular transmitter;

said base unit means including a means for decoding the received signal for determining geographic location position data; and

*a* display means connected to said base unit for displaying the geographic location data.

6. A method for locating a person or object at a remote location from a base location, comprising the steps of:

(a) receiving navigational information signals from a satellite [location] at a remote location;

(*a1*) *providing a timing module that provides a known time signal;*

(b) generating a pseudo random code at said remote location[and];

(*b1*) *providing a converting module, and in the converting module:* comparing said code to [a] *the* known time signal relative to said navigational information signals and producing a position signal therefrom, *and wherein the timing module provides an output to the converting module*;

(c) temporarily storing said position signal;

(d) providing cellular telephone modem signal processing means for continuously transforming said position signals into a celluar signal;

(e) transmitting said cellular telephone signal containing said position signal to a cellular telephone network;

(f) receiving the cellular telephone signal containing said position signal through a cellular telephone attached to a central processing unit; and (g) displaying the navigational signal information received at a base unit.

*7. The system according to claim 1, wherein the remote unit provides latitude and longitude information from a remote location to a base unit display.*

*8. The system according to claim 1, further comprising a cellular telephone receiver having an output for controlling the timing means and the temporarily storing means, said cellular telephone receiver being adapted for receiving voice communications.*

*9. The system according to claim 1, further comprising a cellular receiver adapted for receiving a remotely generated signal for controlling said timing means.*

*10. The system according to claim 1, further comprising a cellular receiver, which in cooperation with said cellular telephone signal transmitting means comprises a cellular telephone.*

*11. The system according to claim 3, wherein the system is useful both as a cellular telephone and portable global positioning system.*

*12. The system according to claim 3, wherein said timing means is further connected with a memory controller for controlling a data flow from said satellite signal and pseudo random code processing means to said telephone modem means for converting said geographical location output signal into a celluar telephone signal.*

*13. The system according to claim 12, wherein the cellular telephone signal receiver is adapted for receiving a remotely generated signal for controlling said timing means and the memory controller for controlling a data flow from said processing means to said telephone modem means.*

14. The system according to claim 3, wherein the cellular telephone signal receiver, which in cooperation with said cellular telephone signal transmitter, comprises a cellular telephone.

15. The system according to claim 5, wherein the timing means provides an output to the converting means.

16. The system according to claim 5, wherein the position information signals comprise latitude and longitude.

17. The system according to claim 5, wherein the system is useful both as a cellular telephone and portable global positioning system.

18. The system according to claim 5, further comprising a cellular telephone receiver having an output for controlling the timing means and the temporarily storing means, said cellular telephone receiver being adapted for receiving voice communications.

19. The system according to claim 5, further comprising a cellular receiver adapted for receiving a remotely generated signal for controlling said timing means.

20. The system according to claim 5, further comprising a cellular receiver, which in cooperation with said cellular telephone signal transmitting means comprises a regular cellular telephone.

21. The system according to claim 5, wherein said timing means is further connected to said means for converting said position information signals into cellular telephone signals and to the memory controller.

22. The method according to claim 6, wherein said processing means continuously transforms the temporarily stored position signal.

23. The system of claim 1 wherein said timing means is for providing time of day signals.

24. The system of claim 1 wherein said timing means is structured to generate time of day signals and transmit said time of day signals to a microprocessor including said signal processing means for generating a pseudo random code.

25. The system of claim 1 wherein said portable hand held unit has a housing that is sized to be held in a single hand.

26. The method of claim 2 further comprising generating said known time in said hand held portable remote unit.

27. The method of claim 2 further comprising generating said known time in the timing module in said portable hand held remote unit and transmitting said known time to a microprocessor in said portable hand held remote unit.

28. The method of claim 27 further comprising performing GDOP calculations in said microprocessor.

29. The method of claim 2 wherein said portable hand held unit has a housing that is sized to be held in a single hand.

30. The system of claim 3 wherein said timing means generates and transmits time of day signals to a microprocessor including said means for generating said pseudo random code.

31. The method of claim 3 wherein said portable housing is sized to be held in a single hand.

32. The system of claim 5 wherein said timing means is structured to generate time of day signals.

33. The system of claim 5 wherein said timing means is for generating time of day signals and transmitting those signals to said means for generating said pseudo random code.

34. The method of claim 5 wherein said portable hand held remote unit is sized to be held in a single hand.

35. The method of claim 6 further comprising generating said known time in said portable hand held remote unit.

36. The method of claim 6 further comprising generating said known time in the timing module in said portable hand held remote unit and transmitting said known time from said central timing circuit to a microprocessor in said portable hand held remote unit.

37. The method of claim 2 wherein said hand held portable remote unit has a housing that is sized to be held in a single hand.

* * * * *